United States Patent
Kang et al.

(10) Patent No.: US 10,654,343 B2
(45) Date of Patent: May 19, 2020

(54) WIRELESS POWER TRANSFER SYSTEM FOR VEHICLE DOOR GLASS

(71) Applicants: Hyundai Motor Company, Seoul (KR); Kia Motors Corporation, Seoul (KR); Omron Automotive Electronic Korea Co., Ltd., Anseong-si (KR)

(72) Inventors: Kwan Hui Kang, Hwaseong-si (KR); Sang Hoon Gweon, Seoul (KR); Joon Koo Hwang, Seoul (KR); Dong Hee Lee, Suwon-si (KR)

(73) Assignees: Hyundai Motor Company, Seoul (KR); Kia Motors Corporation, Seoul (KR); Omron Automotive Electronic Korea Co., Ltd., Anseong-si (KR)

( * ) Notice: Subject to any disclaimer, the term of this patent is extended or adjusted under 35 U.S.C. 154(b) by 0 days.

(21) Appl. No.: 16/190,036

(22) Filed: Nov. 13, 2018

(65) Prior Publication Data

US 2020/0079190 A1 Mar. 12, 2020

(30) Foreign Application Priority Data

Sep. 12, 2018 (KR) .................. 10-2018-0108904

(51) Int. Cl.
*B60J 5/04* (2006.01)
*B60R 16/03* (2006.01)
(Continued)

(52) U.S. Cl.
CPC .......... *B60J 5/0413* (2013.01); *B60J 5/0402* (2013.01); *B60R 16/03* (2013.01); *H02J 50/10* (2016.02);
(Continued)

(58) Field of Classification Search
CPC ........ B60J 5/0413; B60J 5/0402; H02J 50/10; B60R 16/03; H02M 3/33561; H02M 2001/0003
See application file for complete search history.

(56) References Cited

U.S. PATENT DOCUMENTS

2012/0200150 A1   8/2012 Urano
2013/0050797 A1*  2/2013 Takahashi .................. B60J 1/17
                                                     359/245
(Continued)

FOREIGN PATENT DOCUMENTS

FR        2 989 319 A1    10/2013
JP        2010-132142 A    6/2010
(Continued)

OTHER PUBLICATIONS

European Search Report dated Dec. 20, 2018 for European Patent Application No. 18178385.3.

*Primary Examiner* — Carlos Amaya
(74) *Attorney, Agent, or Firm* — Morgan, Lewis & Bockius LLP

(57) ABSTRACT

A wireless power transfer system for a vehicle door glass may include a power transmitter including a first converter converting DC power from a battery into AC power, a transmitting coil wirelessly transmitting the AC power received from the first converter, and a transmitter controller controlling a power level to be output from the first converter; and a power receiver including a receiving coil wirelessly receiving the AC power from the transmitting coil, a second converter and a third converter connected to the receiving coil, and a receiver controller controlling a power level to be output from the second converter and the third converter, wherein the power transmitter is mounted on a vehicle door, and the power receiver is mounted on a door glass.

12 Claims, 13 Drawing Sheets

(51) Int. Cl.
  *H02M 3/335*  (2006.01)
  *H02J 50/10*  (2016.01)
  *H02M 1/00*  (2006.01)

(52) U.S. Cl.
  CPC ............... *H02M 3/33561* (2013.01); *H02M 2001/0003* (2013.01)

(56) References Cited

U.S. PATENT DOCUMENTS

| | | | |
|---|---|---|---|
| 2013/0221744 A1* | 8/2013 | Hall | H02J 50/12 307/9.1 |
| 2014/0247473 A1 | 9/2014 | Kuhnen et al. | |
| 2015/0103280 A1 | 4/2015 | Wang | |
| 2018/0015282 A1 | 1/2018 | Waner et al. | |
| 2018/0093611 A1 | 4/2018 | Kim et al. | |
| 2018/0095586 A1 | 4/2018 | Cho et al. | |
| 2019/0176582 A1 | 6/2019 | Kang | |

FOREIGN PATENT DOCUMENTS

| | | |
|---|---|---|
| JP | 2010-224968 A | 10/2010 |
| JP | 2011-111143 A | 6/2011 |
| KR | 10-0153172 B1 | 10/1998 |
| KR | 10-1730155 B1 | 4/2017 |
| KR | 10-2019-0070026 A | 6/2019 |

* cited by examiner

FIG. 11A
FIG. 11B
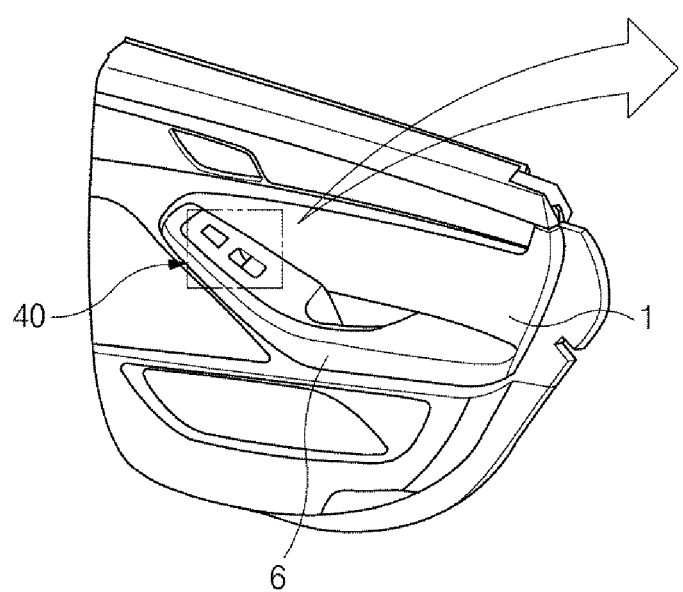
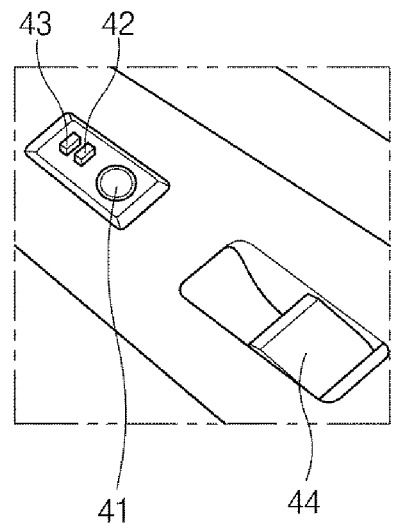

WIRELESS POWER TRANSFER SYSTEM FOR VEHICLE DOOR GLASS

CROSS-REFERENCE TO RELATED APPLICATION

The present application claims priority to Korean Patent Application No. 10-2018-0108904, filed on Sep. 12, 2018, in the Korean Intellectual Property Office, the entire contents of which is incorporated herein for all purposes by this reference.

BACKGROUND OF THE INVENTION

Field of the Invention

The present invention relates to a wireless power transfer system for a vehicle door glass, and more particularly, to a wireless power transfer system for a vehicle door glass, capable of wirelessly supplying power to an electric load of a door glass.

Description of Related Art

In general, a vehicle door is provided with a window regulator that moves a door glass up and down.

The window regulator may be integrated into a door module mounted in the vehicle door, or be directly mounted on an internal panel of the vehicle door. Here, the door module refers to a module in which a latch, the window regulator, and the like are integrated.

In recent years, as a variable transparency layer is embedded in the door glass of the vehicle door, a technology for varying the transparency of the door glass in the vehicle door has been researched and developed. By varying the degree of transparency through the variable transparency layer, the door glass may function as light screens or curtains.

An electrical wire may be connected to a connector of the variable transparency layer, and the variable transparency layer may be configured to receive electrical energy through electrical wiring. The length of the electrical wire may be enough to correspond to an up and down movement distance of the door glass, facilitating the up and down movement of the door glass.

However, due to the length of the electrical wire, excessive noise may be generated when the door glass is moved up and down. Stress may be repeatedly generated in the electrical connector as the wire is strained while moving the door glass up, which may cause the wire to be broken.

Furthermore, after the window regulator is assembled in the vehicle door, the door glass may be assembled with the window regulator, and then the electrical connector may be connected to the door glass through a narrow gap in the vehicle door. Thus, the assembly process may be complicated and inefficient.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a wireless power transfer system for a vehicle door glass, configured for stably supplying power to an electric load of a door glass.

According to various aspects of the present invention, a wireless power transfer system for a vehicle door glass, wirelessly supplying power to a plurality of electric loads mounted on a door glass, may include: a power transmitter including a first converter converting DC power from a battery into AC power, a transmitting coil wirelessly transmitting the AC power received from the first converter, and a transmitter controller configured for controlling a power level to be output from the first converter; and a power receiver including a receiving coil wirelessly receiving the AC power from the transmitting coil, a second converter connected to the receiving coil, and a receiver controller configured for controlling a power level to be output from the second converter, wherein the power transmitter may be mounted on a vehicle door, and the power receiver may be mounted on the door glass.

The second converter may convert the AC power received from the receiving coil into power suitable for the plurality of electric loads.

The wireless power transfer system may further include a manipulation device generating a control signal for operating the plurality of electric loads, and the manipulation device may be electrically connected to the transmitter controller.

The transmitter controller may be configured to control the power level to be output from the first converter according to the control signal received from the manipulation device.

The power transmitter may further include a first signal transceiver connected to the transmitter controller, and the power receiver may further include a second signal transceiver connected to the receiver controller.

The first signal transceiver may transmit the control signal to the second signal transceiver through wireless communication, and the second signal transceiver may transmit a feedback signal related to the operations of the plurality of electric loads to the first signal transceiver through wireless communication.

The receiver controller may be configured to control the power level to be output from the second converter according to the control signal received through the second signal transceiver.

The transmitter controller may be electrically connected to the battery, and the transmitter controller may operate with DC power supplied from the battery.

The receiver controller may operate with power supplied from the second converter.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 11A and FIG. 11B illustrate a manipulation device in a wireless power transfer system for a vehicle door glass according to an exemplary embodiment of the present invention;

Figure 1:
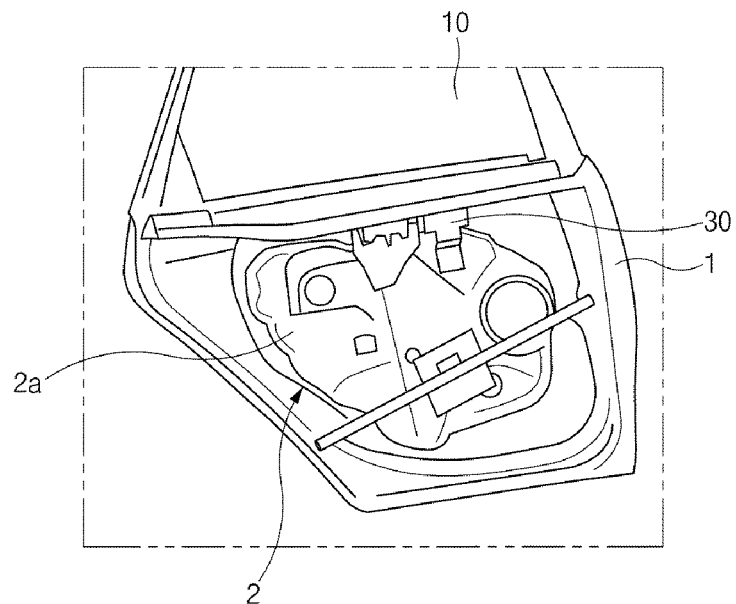
FIG. 1 illustrates a vehicle door to which a wireless power transfer system for a vehicle door glass according to an exemplary embodiment of the present invention is applied.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIGS. 1, 11A and 11B, a vehicle door 1 may include a door glass 10 and a window regulator 8 (see FIG. 10) for moving the door glass 10 up and down. The door glass 10 may be moved by the window regulator 8 between a fully closed position and a fully opened position. The fully closed position refers to a position at which the door glass 10 fully closes an opening of the vehicle door 1, and the fully opened position refers to a position at which the door glass 10 fully opens the opening of the vehicle door 1.

Figure 2:
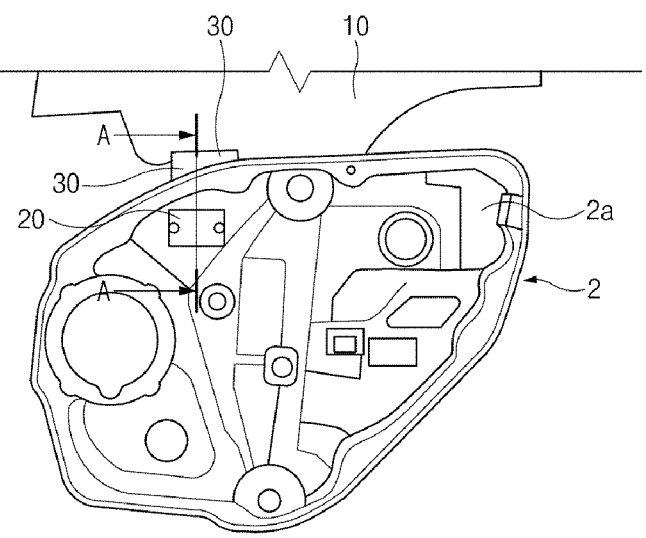
FIG. 2 illustrates a wireless power transfer system for a vehicle door glass according to an exemplary embodiment of the present invention.

According to an exemplary embodiment of the present invention, as illustrated in FIG. 1 and FIG. 2, the window regulator 8 (see FIG. 10) may be integrated into a door module 2, and the door module 2 may be mounted in the internal space of the vehicle door. The door module 2 may include a door module housing 2a, and the window regulator 8, a latch mechanism, and the like may be mounted inside the door module housing 2a. The door module housing 2a may be made of a non-conductive material such as synthetic resin.

Referring to FIG. 2, a wireless power transfer system 100 for a vehicle door glass, according to an exemplary embodiment of the present invention, may supply power to one or more electric loads 15, 51, and 52 mounted on the door glass 10.

Figure 7:
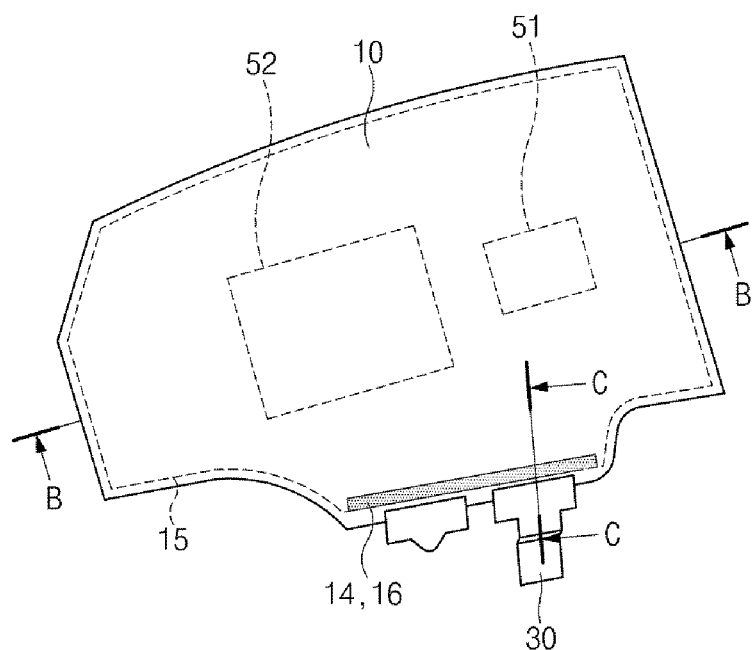
FIG. 7 illustrates the arrangement of a plurality of electric loads on a vehicle door glass in a wireless power transfer system for a vehicle door glass according to an exemplary embodiment of the present invention.

Referring to FIG. 7, the plurality of electric loads 15, 51, and 52 may be mounted on the door glass 10. The plurality of electric loads 15, 51, and 52 may be located between an outdoor glass layer 11 and an interior glass layer 12 of the door glass 10, or be attached to the surface of the door glass 10 facing the internal of the vehicle. The plurality of electric loads 15, 51, and 52 may be configured to use the power which is transmitted by the wireless power transfer system 100. For example, the plurality of electric loads 15, 51, and 52 may be a variable transparency layer 15 varying the transparency of the door glass 10, lighting 51, and display 52.

Referring to FIG. 2, the wireless power transfer system 100 for a vehicle door glass, according to an exemplary embodiment of the present invention, may include a power transmitter 20 mounted on the vehicle door 1, and a power receiver 30 mounted on the door glass 10.

Figure 3:
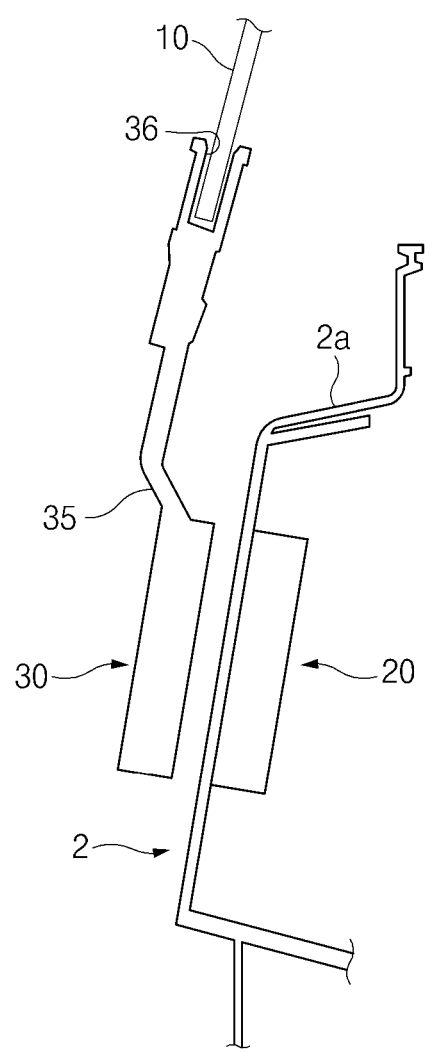
FIG. 3 illustrates a cross-sectional view taken along line A-A of FIG. 2.

Referring to FIG. 3, the power transmitter 20 may be mounted in the internal space of the door module housing 2a of the door module 2. The door module housing 2a may be made of a non-conductive material such as synthetic resin. When the door glass 10 is moved to the fully closed position, the power receiver 30 and the power transmitter 20 may face each other as illustrated in FIG. 3.

Figure 4:
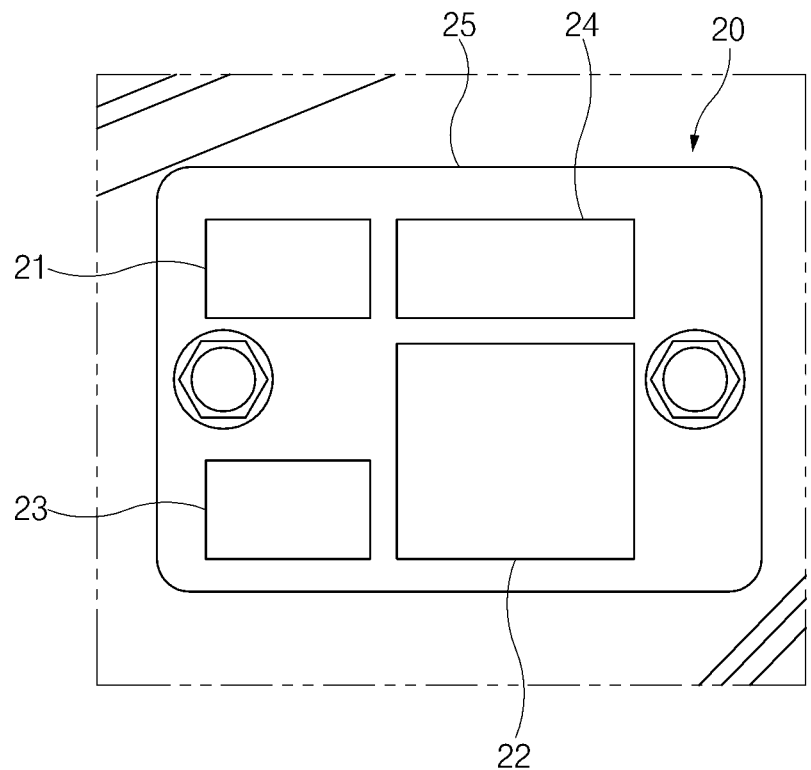
FIG. 4 illustrates a power transmitter in a wireless power transfer system for a vehicle door glass according to an exemplary embodiment of the present invention.

As illustrated in FIG. 4, the power transmitter 20 may include a board 25, a first converter 21, a transmitting coil 22, a transmitter controller 23, and a first signal transceiver 24.

The board 25 may be mounted in the door module housing 2a of the door module 2 using fasteners or the like, and the first converter 21, the transmitting coil 22, and the transmitter controller 23 may be disposed on the board 25.

The first converter 21 may be a DC to AC converter converting direct current (DC) power supplied from a battery 5 into alternating current (AC) power required for wireless power transfer. The first converter 21 may convert DC power supplied from the battery 5 into an AC power signal under control of the transmitter controller 23.

The transmitting coil 22 may receive the AC power signal from the first converter 21, and transmit the power to a receiving coil 32 of the power receiver 30 wirelessly by electromagnetic induction. The transmitting coil 22 may be coupled to a transmitter impedance-matching structure.

The transmitter controller 23 may receive a control signal for controlling the operations of the electric loads 15, 51, and 52, and the control signal may be generated by manipulations of switches 41, 42, 43, and 44 of a manipulation device 40. The transmitter controller 23 may control the operation of the first converter 21 and a power level to be output from the first converter 21 according to the received control signal.

The first converter 21 may convert the DC power into the AC power signal having a frequency suitable for induction of the power signal under control of the transmitter controller 23.

According to an exemplary embodiment of the present invention, the transmitter controller 23 may adjust the amplitude of AC voltage (per hour) output from the first converter 21 according to the received control signal to thereby control the output power level of the first converter 21.

The transmitter controller 23 may include a processor and a memory. The processor may receive instructions and data stored in the memory, and transmit instructions to the first converter 21. The memory may be a data store, such as a hard disk drive, a solid state drive, a volatile storage medium, or a non-volatile storage medium.

Figure 10:
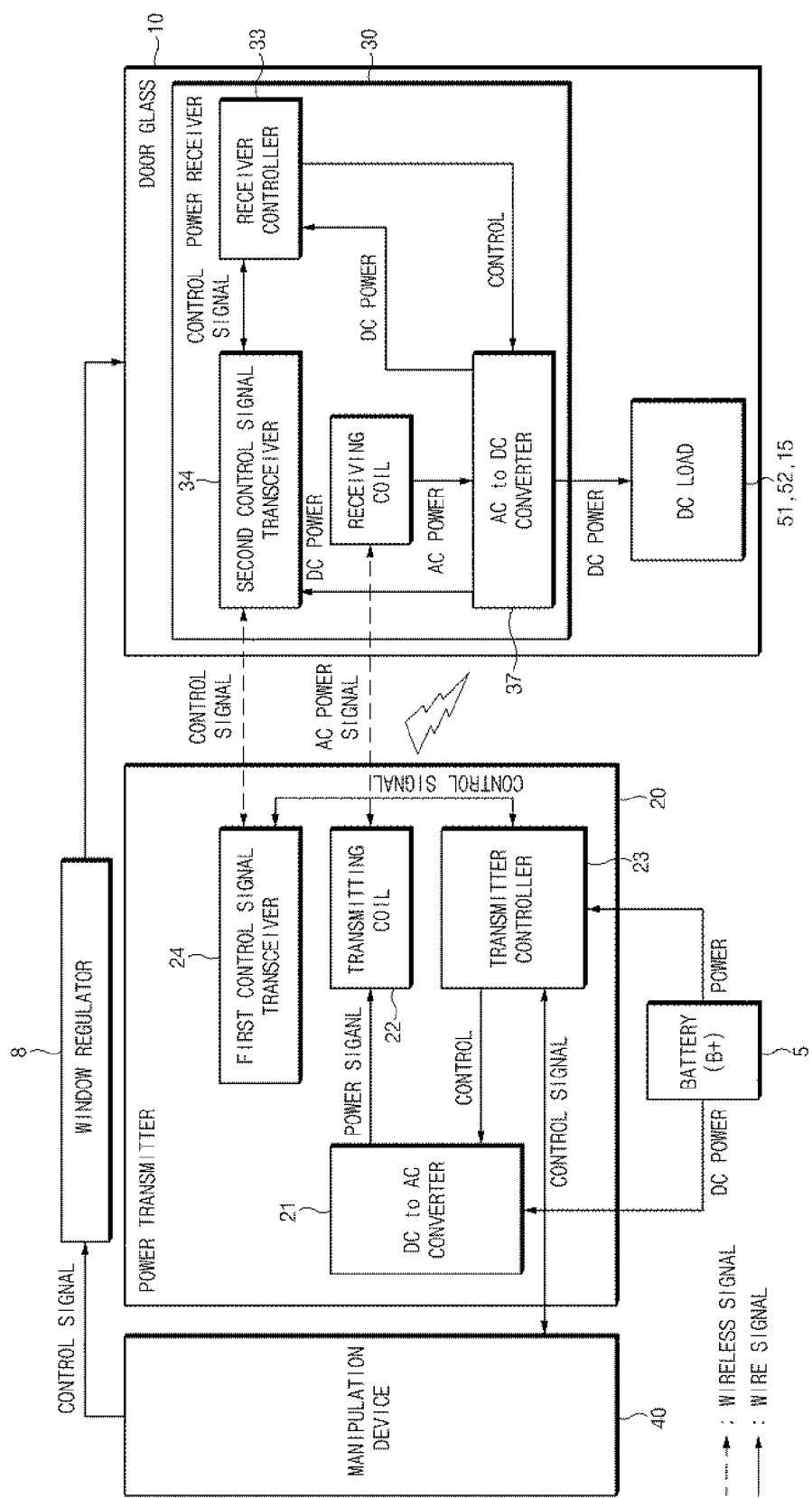
FIG. 10 illustrates a block diagram of a wireless power transfer system for a vehicle door glass according to an exemplary embodiment of the present invention.

Referring to FIGS. 4 and 10, the transmitter controller 23 may transmit the received control signal to the first signal transceiver 24. The first signal transceiver 24 may transmit the control signal received from the transmitter controller 23 to a second signal transceiver 34 of the power receiver 30 through wireless communications. The first signal transceiver 24 may receive feedback signals related to the operations, states, and the like of the electric loads 15, 51, and 52 from the second signal transceiver 34 of the power receiver 30 through wireless communications. The transmitter controller 23 may receive the feedback signals through the first signal transceiver 24, and the transmitter controller 23 may control the output power level of the first converter 21 according to the feedback signals to thereby control the operations of the electric loads 15, 51, and 52. Furthermore, the transmitter controller 23 may transmit the feedback signals related to the operations, states, and the like of the electric loads to the manipulation device 40.

The transmitter controller 23 and the first signal transceiver 24 may be electrically connected to the battery 5, so that the transmitter controller 23 and the first signal transceiver 24 may operate with the DC power supplied from the battery 5.

According to an exemplary embodiment of the present invention, the power transmitter 20 may be mounted in the internal space of the door module housing 2a of the door module 2, as illustrated in FIG. 3. The door module housing 2a may be made of a non-conductive material such as synthetic resin. When the door glass 10 is moved to the fully closed position, the power receiver 30 and the power transmitter 20 may face each other as illustrated in FIG. 3.

Figure 6:
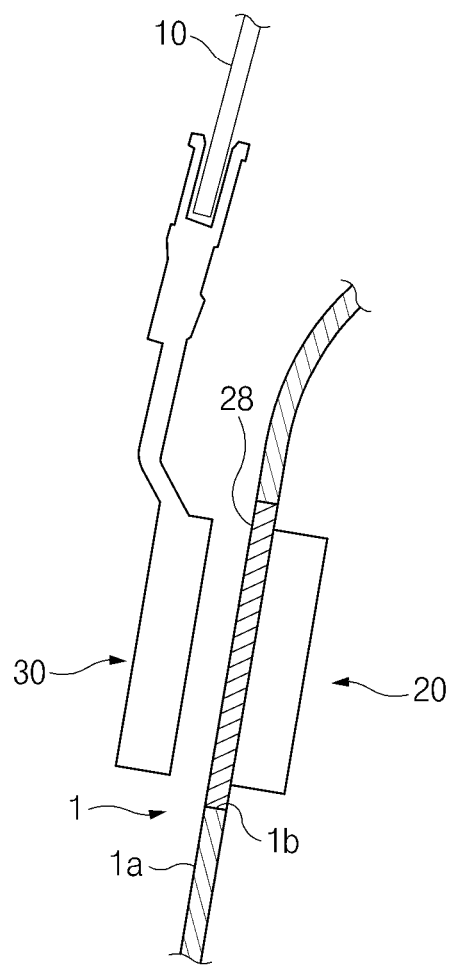
FIG. 6 illustrates a wireless power transfer system for a vehicle door glass according to various exemplary embodiments of the present invention.

According to another exemplary embodiment of the present invention, the window regulator 8 may be directly mounted on an internal panel 1a of the vehicle door 1, and in the instant case, the door module 2 may be removed. When the door module 2 is removed, the power transmitter 20 may be directly mounted on the internal panel 1a of the vehicle door 1. As illustrated in FIG. 6, an opening 1b may be formed in the internal panel 1a of the vehicle door 1, and the power transmitter 20 may be mounted in the opening 1b of the internal panel 1a of the vehicle door 1 through a mounting plate 28. The mounting plate 28 may be made of a non-conductive material such as synthetic resin. Thus, the power transmitter 20 may be disposed inwardly of the internal panel 1a, and be protected by the mounting plate 28.

The power receiver 30 may receive power from the power transmitter 20 wirelessly to supply the power to the electric loads 15, 51, and 52 of the door glass 10.

As illustrated in FIG. 3, the power receiver 30 may be connected to the end portion of the door glass 10.

Figure 5:
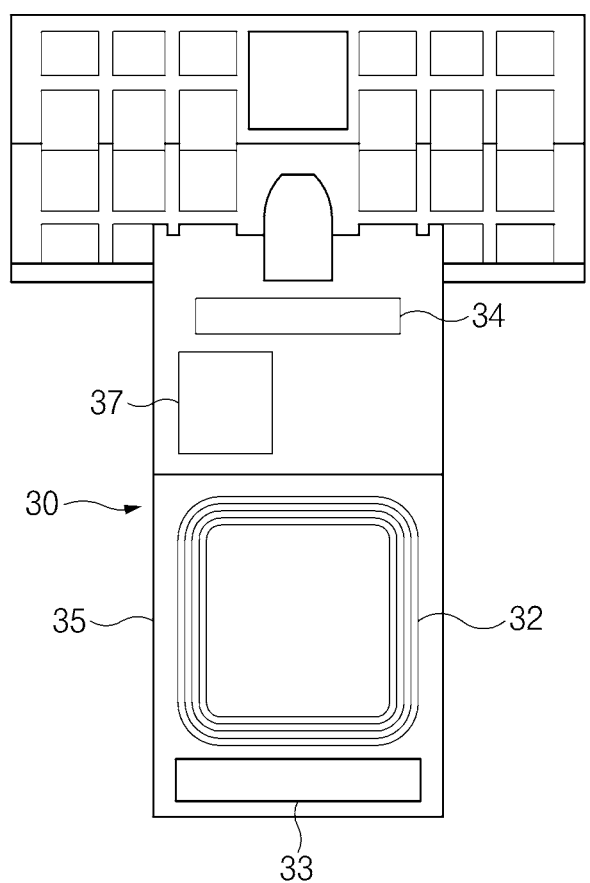
FIG. 5 illustrates a power receiver in a wireless power transfer system for a vehicle door glass according to an exemplary embodiment of the present invention.

As illustrated in FIG. 5, the power receiver 30 may include a body 35, the receiving coil 32, a receiver controller 33, the second signal transceiver 34, and a second converter 37.

As illustrated in FIG. 3, the body 35 may have a coupler 36 which is coupled to the bottom end portion of the door glass 10. The receiving coil 32, the receiver controller 33, the second signal transceiver 34, and the second converter 37 may be disposed on the body 35.

The receiving coil 32 may receive AC power from the transmitting coil 22 wirelessly by electromagnetic induction. The receiving coil 32 may be coupled to a receiver impedance-matching structure.

The second converter 37 may be electrically connected to the receiving coil 32, and the receiving coil 32 may transmit the AC power induced from the transmitting coil 22 to the second converter 37.

The second converter 37 may be electrically connected to the plurality of electric loads 15, 51, and 52. The second converter 37 may convert the AC power received from the receiving coil 32 into power suitable for each of the electric loads 15, 51, and 52.

According to an exemplary embodiment of the present invention, as illustrated in FIG. 10, the plurality of electric loads 15, 51, and 52 may be DC electric loads that operate with DC power. The variable transparency layer 15 may be a DC variable transparency layer, the lighting 51 may be DC lighting such as LED, and the display 52 may be DC display such as transparent display. The DC variable transparency layer may use various technologies, including electrochromic devices and liquid crystal devices. When the plurality of electric loads 15, 51, and 52 are DC electric loads, the second converter 37 may be an AC to DC converter converting AC power received from the receiving coil 32 into DC power. The DC power converted by the second converter 37 may be supplied to each of the DC electric loads.

The receiver controller 33 may control the operation of the second converter 37 and a power level to be output from the second converter 37 according to the received control signal, accurately controlling the operations of the respective electric loads 15, 51, and 52.

Furthermore, the receiver controller 33 and the second signal transceiver 34 may be electrically connected to the second converter 37, so that the receiver controller 33 and the second signal transceiver 34 may operate with the DC power supplied from the second converter 37.

The receiver controller 33 may generate feedback signals related to the operations of the electric loads 15, 51, and 52, and the feedback signals may be transmitted to the transmitter controller 23 through the second signal transceiver 34 and the first signal transceiver 24.

The receiver controller 33 may include a processor and a memory. The processor may receive instructions and data stored in the memory, and transmit instructions to the second converter 37. The memory may be a data store, such as a hard disk drive, a solid state drive, a volatile storage medium, or a non-volatile storage medium.

The receiver controller 33 may receive the control signal from the transmitter controller 23 through the first and second signal transceivers 24 and 34. The receiver controller 33 may control the power level to be output from the second converter 37 according to the received control signal. The receiver controller 33 may receive the control signal from the second signal transceiver 34, and transmit the feedback signal to the second signal transceiver 34.

The second signal transceiver 34 may receive the control signal from the first signal transceiver 24 of the power transmitter 20 through wireless communications, and the second signal transceiver 34 may transmit the feedback signal to the first signal transceiver 24 of the power transmitter 20 through wireless communications. The second signal transceiver 34 may transmit the control signal to the receiver controller 33, and the second signal transceiver 34 may receive the feedback signal from the receiver controller 33.

According to an exemplary embodiment of the present invention, the first signal transceiver 24 and the second signal transceiver 34 may be configured as a wireless communication system for infrared communications, NFC, RF, Wi-Fi, etc., facilitating bidirectional wireless communication or complex signal transmission.

According to another exemplary embodiment of the present invention, when the first signal transceiver 24 and the second signal transceiver 34 perform wireless communication in one direction thereof, the first signal transceiver 24 and the second signal transceiver 34 may be configured as a unidirectional communication system using a hall sensor and a magnet for detecting the hall sensor, so that the first signal transceiver 24 and the second signal transceiver 34 may perform unidirectional wireless communication. For example, the first signal transceiver 24 and the second signal transceiver 34 may be formed of the hall sensor and the magnet to form the unidirectional communication system, detecting the position of the door glass 10. Thus, the transmitter controller 23 and the receiver controller 33 may determine whether the door glass 10 has been moved to the fully closed position (fully closed state).

Referring to FIG. 7, the variable transparency layer 15, the lighting 51, and the display 52 may be overlapped with respect to the door glass 10.

Figure 8:
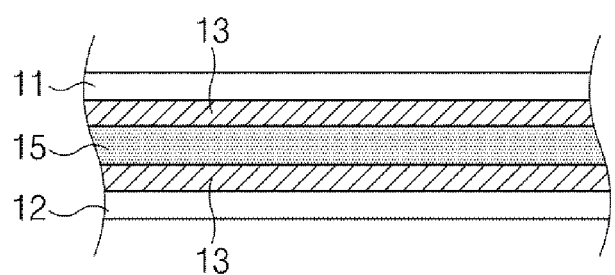
FIG. 8 illustrates a cross-sectional view taken along line B-B of FIG. 7.

Referring to FIG. 8, the door glass 10 may include the outdoor glass layer 11 facing the outside of the vehicle, and the interior glass layer 12 facing the internal of the vehicle, and the variable transparency layer 15 may be located between the outdoor glass layer 11 and the interior glass layer 12. The outdoor glass layer 11 and the interior glass layer 12 may be made of a transparent or translucent material, and the outdoor glass layer 11 and the interior glass layer 12 may be attached to opposite surfaces of the variable transparency layer 15.

For example, the outdoor glass layer 11 and the interior glass layer 12 may be attached to the opposite surfaces of the variable transparency layer 15 using an adhesive layer 13. The adhesive layer 13 may be formed by applying a transparent adhesive to the entire surface of the variable transparency layer 15 or applying a transparent adhesive to edge portions of the variable transparency layer 15.

As an exemplary embodiment of the present invention, when the variable transparency layer 15 includes a material having adhesiveness, the outdoor glass layer 11 and the interior glass layer 12 may be attached to the opposite surfaces of the variable transparency layer 15 without the use of an adhesive. Alternatively, the outdoor glass layer 11 and the interior glass layer 12 may be attached to the opposite surfaces of the variable transparency layer 15 by various methods with static cling, surface tension, or the like, without the use of an adhesive.

Figure 9:
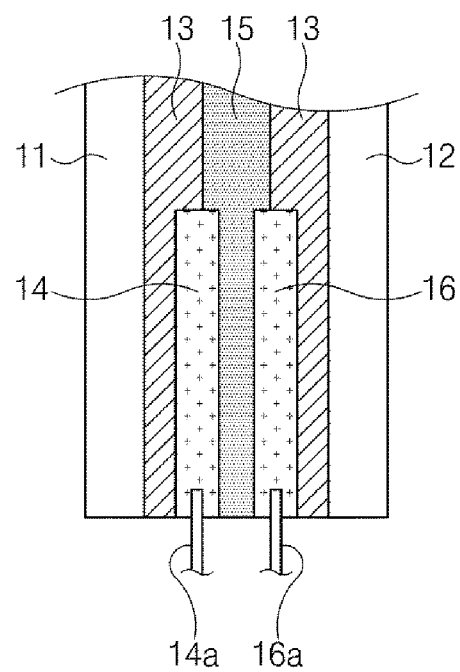
FIG. 9 illustrates a cross-sectional view taken along line C-C of FIG. 7.

Referring to FIG. 9, the door glass 10 may include a pair of electrodes 14 and 16 electrically connected to the variable transparency layer 15. Here, the pair of electrodes 14 and 16 may be a positive electrode 14 and a negative electrode 16. Referring to FIG. 7, the pair of electrodes 14 and 16 may be disposed adjacent to the power receiver 30, and the pair of electrodes 14 and 16 may be individually connected to the second converter 37 of the power receiver 30 through a pair of lead wires 14a and 16a. As the pair of electrodes 14 and 16 is disposed adjacent to the power receiver 30, the lengths of the lead wires 14a and 16a may be shortened.

The LED lighting 51 and the transparent display 52 may be located between the outdoor glass layer 11 and the interior glass layer 12 of the door glass 10 or be attached to the surface of the door glass 10 facing the internal of the vehicle.

Referring to FIG. 10, the wireless power transfer system 100 for a vehicle door glass, according to an exemplary embodiment of the present invention, may include the door glass 10 having the plurality of electric loads 15, 51, and 52, the power transmitter 20 mounted on the vehicle door 1, the power receiver 30 mounted on the door glass 10, and the manipulation device 40 connected to the power transmitter 20.

The manipulation device 40 may be an interface device configured for performing manipulations for the up and down movements of the door glass 10, the operations of the electric loads 15, 51, and 52 of the door glass 10, and the like, and may be disposed on an armrest 6 of the vehicle door 1 as illustrated in FIGS. 11A and 11B. The manipulation device 40 may be electrically connected to the transmitter controller 23 of the power transmitter 20.

The manipulation device 40 may include a plurality of switches 41, 42, 43, and 44. The plurality of switches 41, 42, 43, and 44 may include a first switch 41 generating a control signal for operating the variable transparency layer 15 of the door glass 10, a second switch 42 generating a control signal for operating the LED lighting 51 of the door glass 10, a third switch 43 generating a control signal for operating the transparent display 52 of the door glass 10, and a fourth switch 44 generating a control signal for moving the door glass 10 up and down.

The control signal for varying the transparency (light transmittance) of the variable transparency layer 15 by manipulation of the first switch 41 may be transmitted to the transmitter controller 23 of the power transmitter 20, and the receiver controller 33 of the power receiver 30 may control the second converter 37 such that the transparency (light transmittance) of the door glass 10 may be varied. For example, the first switch 41 may have a rotary knob structure that rotates continuously in a rotating direction thereof, such as a dial gauge, so that the transparency (light transmittance) of the variable transparency layer 15, such as 0% (opaque), 10%, 20%, 30%, . . . , 70%, 80%, 90%, and 100% (maximum transmittance), may vary according to the degree of manipulation (manipulating position) of the first switch 41.

The control signal for turning on/off the LED lighting 51 by manipulation of the second switch 42 may be transmitted to the transmitter controller 23 of the power transmitter 20, and the receiver controller 33 of the power receiver 30 may control the second converter 37 such that the LED lighting 51 may be turned on or turned off.

The control signal for turning on/off the transparent display 52 by manipulation of the third switch 43 may be transmitted to the transmitter controller 23 of the power transmitter 20, and the receiver controller 33 of the power receiver 30 may control the second converter 37 such that the transparent display 52 may be turned on or turned off.

The control signal for moving the door glass 10 up and down by manipulation of the fourth switch 44 may be transmitted to the controller of the window regulator 8, and the window regulator 8 may move the door glass 10 up and down such that the degree of up/down movement of the door glass 10 may be adjusted by the control signal.

Figure 12:
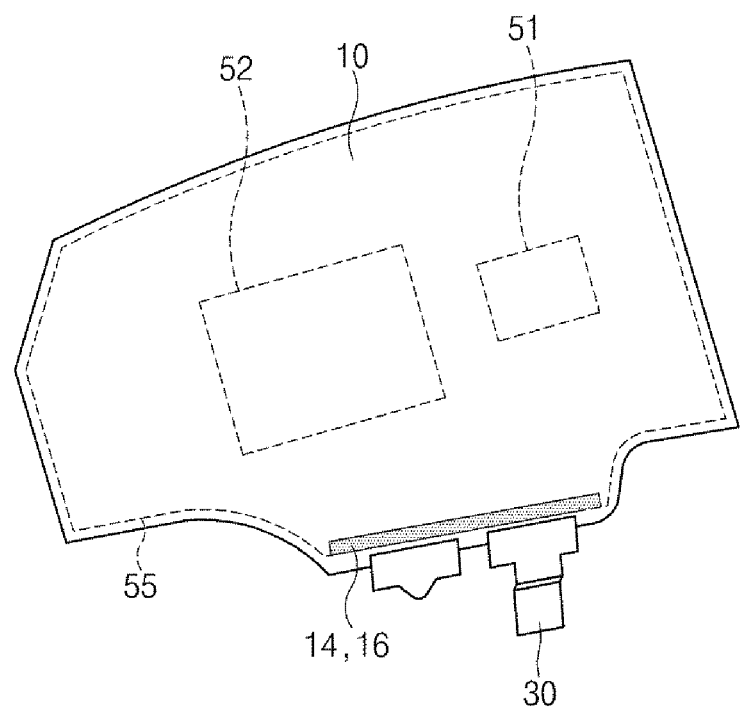
FIG. 12 illustrates the arrangement of a plurality of electric loads on a vehicle door glass in a wireless power transfer system for a vehicle door glass according to various exemplary embodiments of the present invention.
Figure 13:
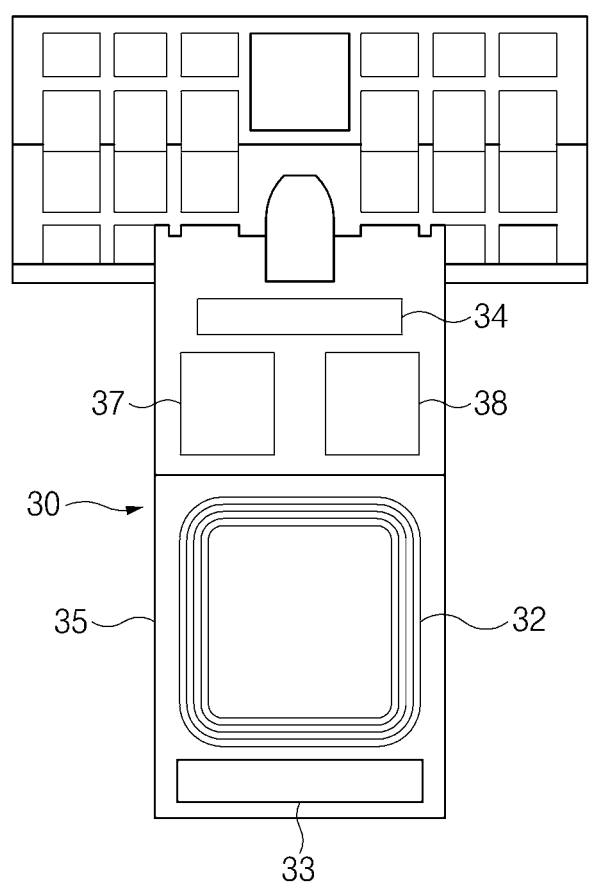
FIG. 13 illustrates a power receiver in a wireless power transfer system for a vehicle door glass according to various exemplary embodiments of the present invention.
Figure 14:
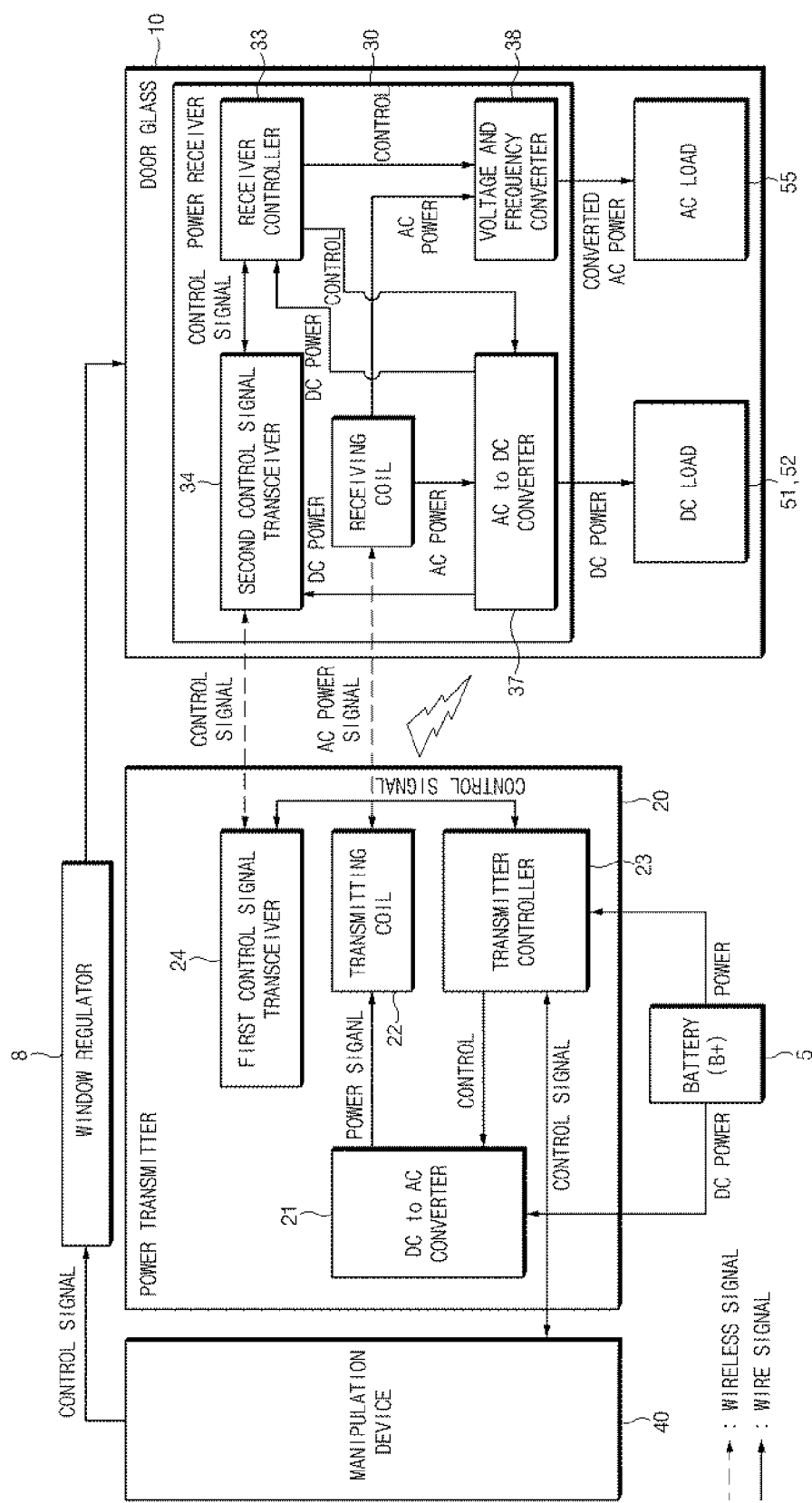
FIG. 14 illustrates a block diagram of a wireless power transfer system for a vehicle door glass according to various exemplary embodiments of the present invention.

According to various exemplary embodiments of the present invention, as illustrated in FIGS. 12 to 14, a variable transparency layer 55, the lighting 51, and the display 52 may be provided to the door glass 10, and the variable transparency layer 55 may be an AC electric load operating with AC power. In other words, the variable transparency layer 55 may be an AC variable transparency layer operating with AC power. The AC variable transparency layer 55 may use various technologies, including suspended particle devices (SPD) and polymer dispersed liquid crystal display (PDLCD). The lighting 51 may be DC lighting operating with DC power, and the display 52 may be DC display operating with DC power.

The AC variable transparency layer 55 may have the same structure as that of the DC variable transparency layer 15 illustrated in FIG. 8 and FIG. 9.

As illustrated in FIGS. 13 and 14, the AC variable transparency layer 55 may be configured for its light transmittance varying according to the amplitude of AC voltage. When an AC voltage higher than or equal to a predetermined voltage is applied to the AC variable transparency layer 55, the arrangement of molecules forming the AC variable transparency layer 55 may change so that light transmittance may be varied. The light transmittance of the AC variable transparency layer 55 may vary according to the amplitude of AC voltage. As the AC voltage increases, a variation in light transmittance may increase. However, when the applied voltage reaches a saturation point, the light transmittance may not change any more.

According to various exemplary embodiments of the present invention, a third converter 38 may be electrically connected to the AC variable transparency layer 55. The third converter 38 may convert the voltage and frequency of AC power received from the receiving coil 32, and the AC power converted by the third converter 38 may be applied to the AC variable transparency layer 55 which is an AC electric load. The receiver controller 33 may control the operation of the third converter 38 and the amplitude of AC voltage to be output from the third converter 38 according to the received control signal, so that the transparency (light transmittance) of the variable transparency layer 55 may be varied.

According to various exemplary embodiments of the present invention, the first converter 21 may output an AC power signal having a frequency higher than a rated frequency of an AC electric load such as the AC variable transparency layer 55 under control of the transmitter controller 23. For example, when the rated frequency of the AC variable transparency layer 55 is 60 Hz, the first converter 21 may output an AC power signal having a frequency of 100 kHz higher than the rated frequency of the AC variable transparency layer 55, so that electromagnetic induction (or induction of the power signal) between the transmitting coil 22 and the receiving coil 32 may be facilitated, and thus the efficiency of wireless power transfer may be significantly improved. Meanwhile, in a case in which the AC variable transparency layer 55 has a rated voltage of 110V and a rated frequency of 60 Hz, when the first converter 21 outputs AC power having a rated voltage of 110V and a rated frequency of 60 Hz equal to the rated voltage and rated frequency of the AC variable transparency layer 55 to the transmitting coil 22, the sizes of an inductor and a capacitor for the induction of the power signal may be relatively large, making the assembly or mounting of the power transmitter 20 and the power receiver 30 difficult. On the other hand, in the exemplary embodiment of the present invention, the first converter 21 may output the AC power signal having a frequency of 100 Hz higher than the rated frequency (60 Hz) of the AC variable transparency layer 55 to the transmitting coil 22, making the sizes of an inductor and a capacitor for the induction of the power signal compact.

According to various exemplary embodiments of the present invention, the third converter 38 may convert the frequency of AC power received from the receiving coil 32 into a frequency equal to the rated frequency of the AC variable transparency layer 55 under control of the receiver controller 33. For example, when the rated frequency of the AC variable transparency layer 55 is 60 Hz, the third converter 38 may convert the frequency (for example, 100 kHz) of the AC power received from the receiving coil 32 into 60 Hz. The receiver controller 33 may adjust the amplitude of AC voltage (per hour) output from the third converter 38 according to the control signal received through the second signal transceiver 34 to thereby control the output power level of the third converter 38. The receiver controller 33 may transmit instructions to the second converter 37 and the third converter 38, and control the operation of the second converter 37, the operation of the third converter 38, the output power level of the second converter 37, the output power level of the third converter 38 according to the control signal received from the transmitter controller 23 through the first and second signal transceivers 24 and 34.

Since the other configurations and operations are the same as or similar to those in the exemplary embodiments illustrated in FIGS. 1 to 11B, a detailed description thereof will be omitted.

According to an exemplary embodiment of the present invention, the variable transparency layer 15 or 55 may remain opaque when no electric power is applied, and may become transparent when electric power is applied.

According to another exemplary embodiment of the present invention, the variable transparency layer 15 or 55 may remain transparent when no electric power is applied, and may become opaque when electric power is applied.

According to another exemplary embodiment of the present invention, the variable transparency layer 15 or 55 may change from a first state (for example, a transparent state) to a second state (for example, an opaque state) when electric power is applied, remain in the second state due to a memory effect even without any additional application of electric power, and change from the second state to the first state when electric power is applied again.

Figure 15:
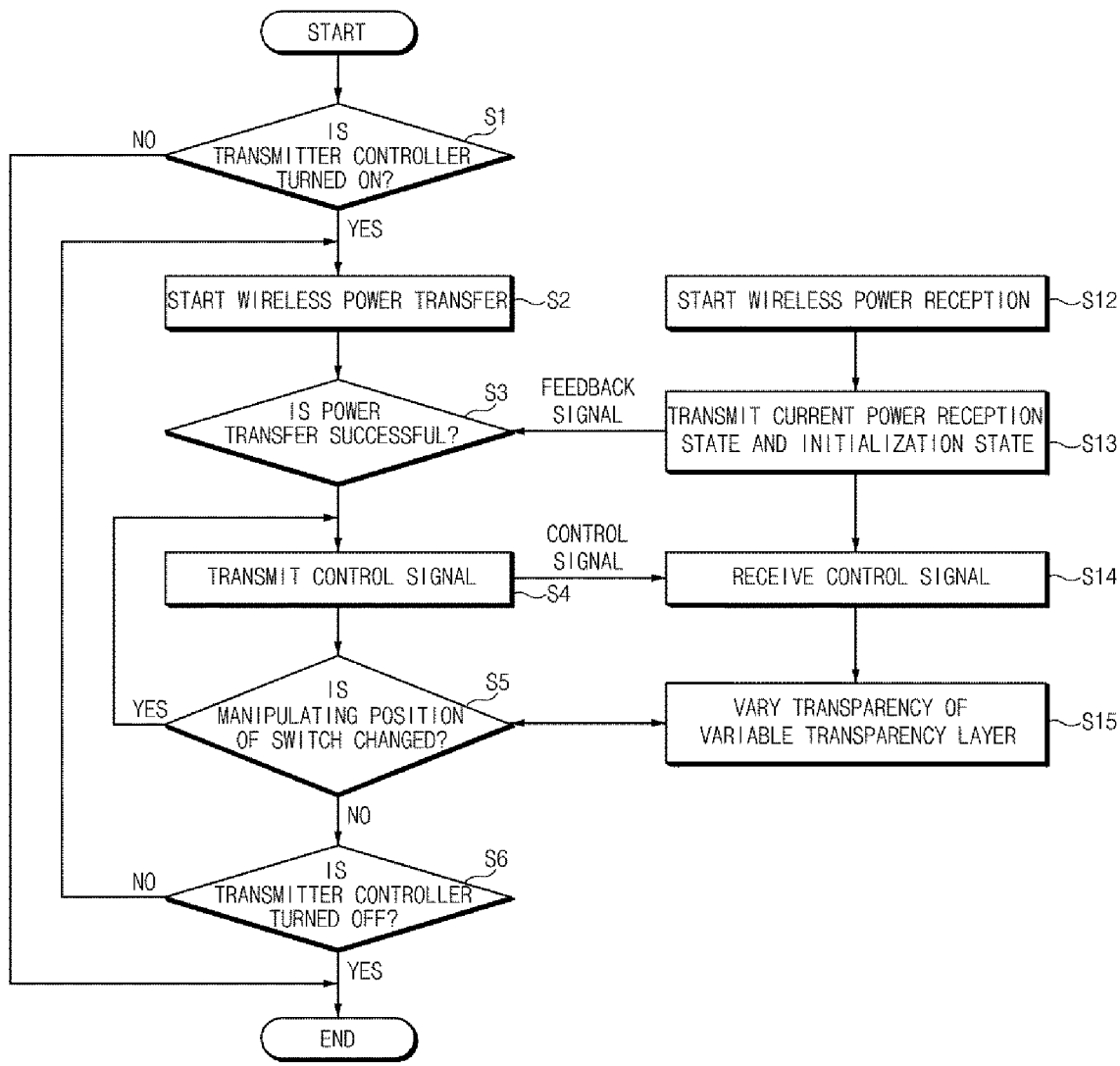
FIG. 15 illustrates a flowchart of a control method of a wireless power transfer system for a vehicle door glass according to an exemplary embodiment of the present invention.

Referring to FIG. 14, and FIG. 15, a process of varying the transparency (light transmittance) of the AC variable transparency layer 55 in the wireless power transfer system 100 for a vehicle door glass according to various exemplary embodiments of the present invention will be detailed.

When a user activates the first switch 41 of the manipulation device 40, the transmitter controller 23 receives DC power from the battery 5 so that it may be turned on in operation S1. When the user does not activate the first switch 41 of the manipulation device 40, the transmitter controller 23 does not receive DC power from the battery 5 so that it may be turned off.

When the transmitter controller 23 is turned on, the first converter 21 may be operated by the transmitter controller 23, and the first converter 21 may convert the DC power supplied from the battery 5 into AC power. The converted AC power (for example, AC 100 kHz) may be transmitted to the receiving coil 32 of the power receiver 30 through the transmitting coil 22 to start wireless power transfer in operation S2.

The receiving coil 32 of the power receiver 30 may receive the power from the transmitting coil 22 of the power transmitter 20 wirelessly in operation S12.

The AC power which the receiving coil 32 of the power receiver 30 receives may be converted into DC power by the second converter 37, and the DC power may be supplied to the receiver controller 33 and the second signal transceiver 34. The receiver controller 33 and the second signal transceiver 34 of the power receiver 30 may be turned on by the DC power, and the receiver controller 33 may transmit a feedback signal related to a current power reception state and/or initialization state of the power receiver 30 to the transmitter controller 23 of the power transmitter 20 through the second signal transceiver 34 and the first signal transceiver 24 in a wireless communication method in operation S13.

The transmitter controller 23 of the power transmitter 20 may determine whether the wireless power transfer is successful based on the feedback signal received from the power receiver 30 in operation S3.

When the transmitter controller 23 determines that the wireless power transfer is successful, it may transmit a control signal related to the degree of manipulation (manipulating position) of the first switch 41 to the receiver controller 33 through the first signal transceiver 24 and the second signal transceiver 34 in a wireless communication method in operation S4.

The receiver controller 33 of the power receiver 30 may receive the control signal from the transmitter controller 23 in operation S14, and the receiver controller 33 may adjust the amplitude of AC voltage output from the third converter 38 according to the received control signal to thereby vary the transparency (light transmittance) of the AC variable transparency layer 55 in operation S15. For example, when the first switch 41 has a rotary knob structure such as a dial gauge, the receiver controller 33 may adjust the amplitude of AC voltage output from the third converter 38 according to the degree of manipulation (manipulating position) of the first switch 41, varying the transparency (light transmittance) of the variable transparency layer 55, such as 0% (opaque), 10%, 20%, 30%, ..., 70%, 80%, 90%, and 100% (maximum transmittance).

The transmitter controller 23 may determine whether the manipulating position of the first switch 41 is changed in operation S5. When the manipulating position of the first switch 41 is changed, the first switch 41 may change the control signal according to the changed manipulating position and transmit it to the transmitter controller 23, and the transmitter controller 23 may transmit the changed control signal to the receiver controller 33 of the power receiver 30 in operation S4, and repeat subsequent operations.

When the manipulating position of the first switch 41 is not changed, it may be determined whether the transmitter controller 23 is turned off in operation S6. When the user does not activate the first switch 41 of the manipulation device 40, the transmitter controller 23 does not receive DC power from the battery 5 so that it may be turned off.

As set forth above, the wireless power transfer system according to exemplary embodiments may stably supply power to the electric loads of the door glass through wireless power transfer, accurately controlling the electric loads of the door glass, preventing the problems of noise, breaking of wire, etc., and improving durability and the ease of assembly.

Furthermore, the wireless power transfer system according to exemplary embodiments may be configured to divide the wirelessly received power into AC power and DC power, so that the door glass may have a DC electric load and an AC electric load. Thus, the door glass may perform various functions through various electric loads, such as LED lighting and transparent display, in addition to the variable transparency layer.

Furthermore, according to exemplary embodiments of the present invention, the power transmitter may output AC power having a frequency higher than a rated frequency of an AC electric load, so that the induction of a power signal (or the induction of an electromagnetic field) may be facilitated, and thus the efficiency of wireless power transfer may be significantly improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A wireless power transfer system for a vehicle door glass, wirelessly supplying power to a plurality of electric loads provided on the vehicle door glass, the wireless power transfer system comprising:

a power transmitter including:
  a first converter configured for converting DC power of a battery into AC power;
  a transmitting coil configured for wirelessly transmitting the AC power received from the first converter;
  a transmitter controller configured for controlling a power level to be output from the first converter;
  a board on which the first converter, the transmitting coil, and the transmitter controller are mounted; and
a power receiver including:
  a receiving coil configured for wirelessly receiving the AC power from the transmitting coil;
  a second converter connected to the receiving coil;
  a receiver controller configured for controlling a power level to be output from the second converter; and
  a body on which the receiving coil, the second converter, and the receiver controller are mounted,
wherein the board of the power transmitter is mounted on a vehicle door,
wherein the body of the power receiver is mounted on the door glass, and
wherein the body has a coupler which is coupled to a bottom end portion of the door glass.

2. The wireless power transfer system of claim 1, wherein the second converter converts the AC power received from the receiving coil into power for the plurality of electric loads.

3. The wireless power transfer system of claim 1, farther including:
  a manipulation device generating a control signal for operating the plurality of electric loads,
  wherein the manipulation device is electrically connected to the transmitter controller.

4. The wireless power transfer system of claim 3,
  wherein the transmitter controller is configured to control the power level to be output from the first converter according to the control signal received from the manipulation device.

5. The wireless power transfer system of claim 3,
  wherein the power transmitter further includes a first signal transceiver connected to the transmitter controller, and
  wherein the power receiver further includes a second signal transceiver connected to the receiver controller.

6. The wireless power transfer system of claim 5,
  wherein the first signal transceiver transmits the control signal to the second signal transceiver through wireless communication, and
  wherein the second signal transceiver transmits a feedback signal related to operations of the plurality of electric loads to the first signal transceiver through wireless communication.

7. The wireless power transfer system of claim 6, wherein the receiver controller is configured to control the power level to be output from the second converter according to the control signal received through the second signal transceiver.

8. The wireless power transfer system of claim 1,
  wherein the transmitter controller is electrically connected to the battery, and
  wherein the transmitter controller is configured to operate with the DC power supplied from the battery.

9. The wireless power transfer system of claim 1, wherein the receiver controller is configured to operate with power supplied from the second converter.

10. The wireless power transfer system of claim 1, wherein the plurality of electric loads includes a variable transparency layer, lighting, and display.

11. A method of varying a transparency of a variable transparency layer for a vehicle door glass in the wireless power transfer system of claim 1, the method comprising:
  operating the first converter, by the transmitter controller, wherein the first converter converts the DC power supplied from the battery into the AC power;
  transmitting the converted AC power to the receiving coil of the power receiver through the transmitting coil;
  receiving, by the receiving coil of the power receiver, the converted AC power from the transmitting coil of the power transmitter wirelessly;
  converting, by the second converter, the AC power which the receiving coil of the power receiver receives, into DC power;
  supplying the converted DC power to the receiver controller the second signal transceiver;
  transmitting, by the receiver controller, a feedback signal related to a current power reception state or initialization state of the power receiver to the transmitter controller of the power transmitter through the second signal transceiver and the first signal transceiver in a wireless communication method;
  determining, by transmitter controller of the power transmitter when the power is successfully transferred based on the feedback signal;
  when the transmitter controller verifies that the power is successfully transferred, transmitting a control signal related to a degree of manipulation of a switch to the receiver controller through a first signal transceiver of the power transmitter and a second signal transceiver of the power receiver;
  receiving, by the receiver controller of the power receiver, the control signal from the transmitter controller, and adjusting, by the receiver controller, an amplitude of AC voltage output from a third converter according to the received control signal to thereby vary the transparency of the variable transparency layer.

12. The method of claim 11, further including:
  determining, by the transmitter controller, when a manipulating position of the switch is changed; and
  when the manipulating position of the switch is changed, transmitting, by the transmitter controller, the changed control signal to the receiver controller of the power receiver.

* * * * *